US008615272B2

(12) United States Patent      (10) Patent No.:    US 8,615,272 B2
Chatrath      (45) Date of Patent:    Dec. 24, 2013

(54) METHOD AND SYSTEM FOR ASSOCIATING SUBSCRIBER IDENTITY MODULE

(75) Inventor: Vishal Chatrath, Kalervonie (FI)

(73) Assignee: Nokia Corporation, Espoo (FI)

( * ) Notice: Subject to any disclaimer, the term of this patent is extended or adjusted under 35 U.S.C. 154(b) by 1778 days.

(21) Appl. No.: 10/855,551

(22) Filed: May 26, 2004

(65) Prior Publication Data

US 2005/0266883 A1    Dec. 1, 2005

(51) Int. Cl.
*H04M 1/00*      (2006.01)
(52) U.S. Cl.
USPC .............. 455/556.1; 455/550.1; 455/557; 455/558; 455/559; 455/556.2
(58) Field of Classification Search
USPC .......... 455/558, 550.1, 556.1, 556.2, 557, 559
See application file for complete search history.

(56) References Cited

U.S. PATENT DOCUMENTS

| | | | | |
|---|---|---|---|---|
| 5,933,785 | A * | 8/1999 | Tayloe | 455/558 |
| 6,466,804 | B1 * | 10/2002 | Pecen et al. | 455/558 |
| 6,868,282 | B2 * | 3/2005 | Carlsson | 455/558 |
| 2004/0023689 | A1 * | 2/2004 | Ahonen | 455/558 |
| 2004/0042604 | A1 * | 3/2004 | Hiltunen et al. | 379/211.05 |
| 2004/0043792 | A1 * | 3/2004 | Simmons | 455/558 |
| 2004/0180657 | A1 * | 9/2004 | Yaqub et al. | 455/435.1 |
| 2004/0204087 | A1 * | 10/2004 | Carlsson | 455/558 |
| 2005/0009563 | A1 * | 1/2005 | Stenmark | 455/558 |

FOREIGN PATENT DOCUMENTS

| | | |
|---|---|---|
| GB | 2 365 699 | 2/2002 |
| WO | WO 02/41597 | 5/2002 |
| WO | WO 02/089449 | 11/2002 |
| WO | WO 02/093811 | 12/2002 |
| WO | 03084265 A1 | 10/2003 |

OTHER PUBLICATIONS

European office action for patent application No. 05 749 392.6-2412 mailed Oct. 19, 2011.
Notification of 2nd Office Action for Chinese Application No. 200580025015.2, mailed Mar. 29, 2010.

* cited by examiner

*Primary Examiner* — Fayyaz Alam
(74) *Attorney, Agent, or Firm* — Banner & Witcoff, Ltd.

(57) ABSTRACT

A method, device, system, and module associate subscriber identity information with terminals in a communication network. For example, the method includes establishing a connection between a first terminal and a second terminal and communicating a software subscriber identity module from the first terminal to the second terminal. The software subscriber identity module includes a standard component and an active component. The standard component is communicated only when needed.

26 Claims, 2 Drawing Sheets

SoS Database
(at the Service Provider)

METHOD AND SYSTEM FOR ASSOCIATING SUBSCRIBER IDENTITY MODULE

FIELD OF THE INVENTION

The present invention relates to wireless communications. More particularly, the present invention relates to an improved method and system for associating subscriber identity information.

BACKGROUND OF THE INVENTION

The systems, apparatus, and methods described in this section could be pursued, but are not necessarily ones that have been previously conceived or pursued. Therefore, unless otherwise indicated herein, what is described in this section is not prior art to the claims in this application and is not admitted to be prior art by inclusion in this section.

Generally, a Subscriber Identity Module (SIM) card is a small printed circuit board that must be inserted in a GSM-based mobile phone when signing on as a subscriber. The SIM card typically contains subscriber details, security information and memory for a personal directory of numbers. The card can be a small plug-in type or sized as a credit-card but has the same functionality. The SIM card also stores data that identifies the caller to the network service provider.

The SIM card is not movable between devices without utilizing a manual process. Indeed, a person owning multiple mobile devices has to manually move the SIM card containing subscriber identification information from one terminal to another. Typically, this long and cumbersome process includes: switching off the terminal, removing the back cover of the device, removing the battery, removing the SIM card, replacing the battery, replacing the cover, opening the cover of the second terminal, removing the battery of the second terminal, putting the SIM card into the second terminal, replacing the battery of the second terminal, replacing the cover of the second terminal, and powering up the second terminal.

This manual process of transferring a SIM card from one device to another only works if both devices are available. Also, if the device or terminal is lost or stolen, the user also loses the SIM card. Heretofore, there are no solutions that address these problems.

Published patent application WO 02089449, which is assigned to the same assignee as the present application, describes a software SIM. However, this published application handles SIM as one software component and consumes a lot of network bandwidth when the identity is changed from one device to another.

Thus, there is a need for SIM that can be easily transferred from device to device. Further, there is a need for an improved software SIM. Even further, there is a need for an improved method for associating subscriber identity information with multiple terminals.

SUMMARY OF THE INVENTION

The present invention is directed to storing SIM information in a software file in a mobile terminal. Briefly, one exemplary embodiment relates to a method of associating subscriber identity information with terminals in a communication network. The method includes establishing a connection between a first terminal and a second terminal and communicating a software subscriber identity module from the first terminal to the second terminal. The software subscriber identity module includes a standard component and an active component. The standard component is communicated only when needed.

Another exemplary embodiment relates to a system for associating subscriber identity information. The system includes a software subscriber identity module containing subscriber identity information, a database having data associated with the software subscriber identity module, and a first terminal having programmed instructions to communicate the software subscriber identity module to a second terminal. The software subscriber identity module includes a standard component and an active component.

Yet another exemplary embodiment relates to a device having a software subscriber identity module. The device includes a processor that execute programmed instructions; and a store that maintains programmed instructions and a software subscriber identity module containing subscriber information for associating the device with a subscriber service. The software subscriber identity module includes a standard component and an active component.

Another exemplary embodiment relates to a system for associating subscriber identity information. The system includes means for establishing a connection between a first terminal and a second terminal and means for communicating a software subscriber identity module from the first terminal to the second terminal. The software subscriber identity module includes a standard component and an active component. The standard component is communicated only when needed.

Yet another exemplary embodiment relates to a module that protects software subscriber identity information. The module includes subscriber information that associates a device with a subscriber service The software subscriber identity module comprises a standard component and an active component.

Other principle features and advantages of the invention will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION OF EXEMPLARY EMBODIMENTS

Figure 1:
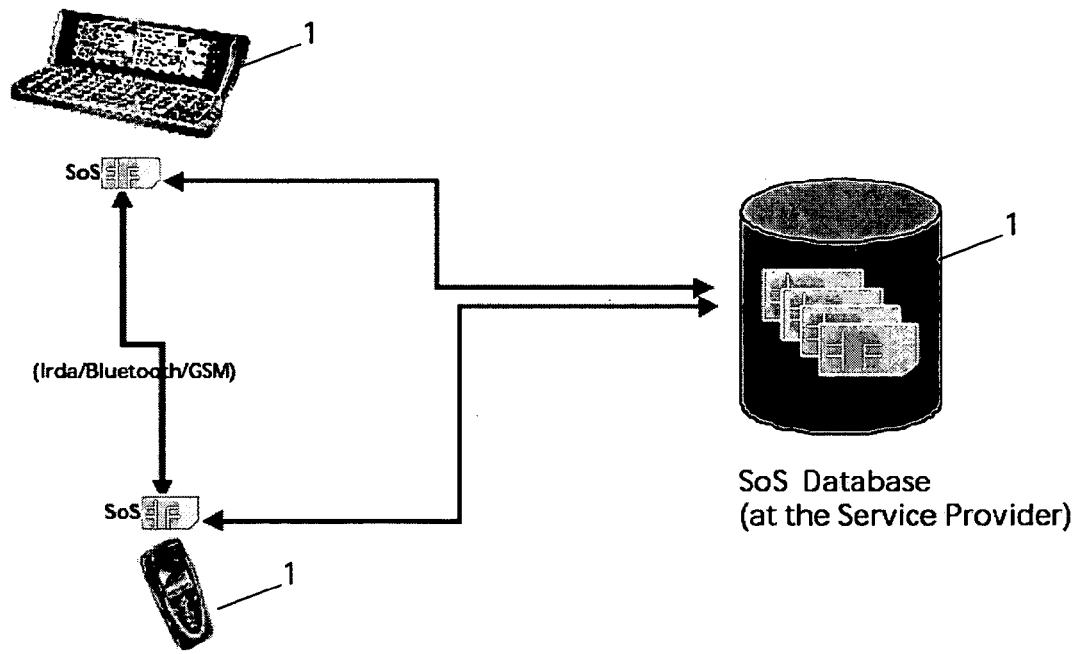
FIG. 1 is a diagram depicting a software subscriber identity module system in accordance with an exemplary embodiment.

FIG. 1 illustrates a database 12 having subscriber identity information. In at least one embodiment, the database 12 is located at a service provider. The subscriber identity information can include a software subscriber identity module (SIM) or a soft SIM. The soft SIM is communicated to a terminal 14 and the terminal 14 is activated. The terminal 14 sends a message to the service provider giving details about the terminal 14. In an exemplary embodiment, the details can include information based on the OMA (Object Management Architecture) standard. The service provider can automatically optimize its services for the terminal 14. The database 12 is maintained at the service provider for any emergency, service or support needs.

Alternatively, the soft SIM can be transferred from one terminal to another directly (such as, terminal 14 to terminal 16), whenever the user wishes to change his/her terminal. Thus, a user can own devices for different activities and can choose which one is most appropriate for that occasion. This mechanism can also be used when a new device is purchased. In this case, the user can transfer the soft SIM to the new terminal.

Figure 2:
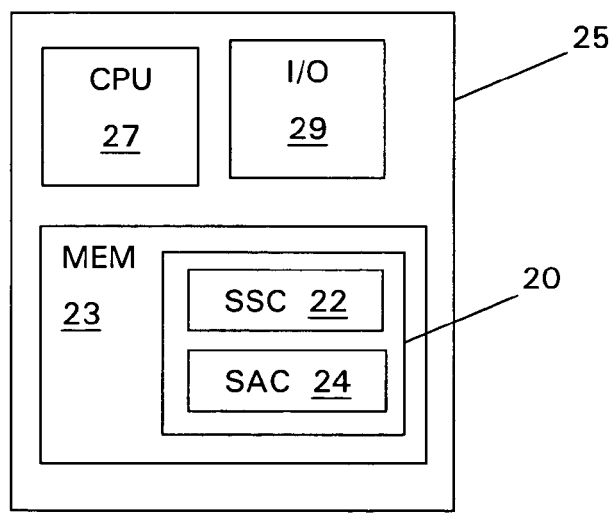
FIG. 2 is a diagram depicting components of a software subscriber identity module framework in accordance with an exemplary embodiment.

FIG. 2 illustrates components of a SoS (soft SIM) framework for an example Soft SIM (SoS) 20. Instead of the SIM information being stored in a hard module, it is stored in a software file in terminal, or a Soft SIM (SoS). The SoS can easily be transferred between terminals. In a typical use case scenario, a user with one SoS but multiple handsets can transfer his SoS to a new terminal with a single action. When this operation is conducted, a new terminal becomes an active terminal and the all the other terminals become passive. In order to limit the size of the file transfer when SoS is transferred from one terminal to another, the SoS 20 is divided into a SIM Standard Component (SSC) 22 and a SIM Active Component (SAC) 24.

The SSC 22 contains handshaking information required to make a successful connection between the network and the terminal. The SSC 22 is common to all terminals in the SoS federation or association. As a part the SoS transfer process, the mechanism by which PIM (personal information manager) information is automatically updated into the terminal in hand is included, so that the user does not have to start a separate synchronization process.

The SAC 24, on the other hand, is an activating key that defines whether a terminal is active or passive. Each terminal in a SoS federation has a unique SAC 24. The first time transfer of SoS 20 between terminals consists of both the SSC 22 and SAC 24 components. Future inter-terminal SoS transfers may consist of SAC 24 only to conserve bandwidth. However, there may be circumstances when the SSC 22 and SAC 24 are both needed, for example if the information in a terminal is a wrong version, is not supported by the transferring terminal, or if information in the SSC 22 does not exist in the destination terminal, both the SSC 22 and SAC 24 may be transferred.

The SoS 20 including the SSC 22 and SAC 24 can be contained in a memory 23 of a device 25 used for communications, such as a phone. The SSC 22 and SAC 24 can be contained in separate and distinct memory locations in the memory 23. The device 25 also includes a CPU (central processing unit) 27 and an I/O (input/output) module 29. Further, the device contains a communication means, such as cellular, Bluetooth, or infrared (IR). The SSC 22 and SAC 24 can be contained in a module and encrypted to protect the information contained therein.

Figure 3:
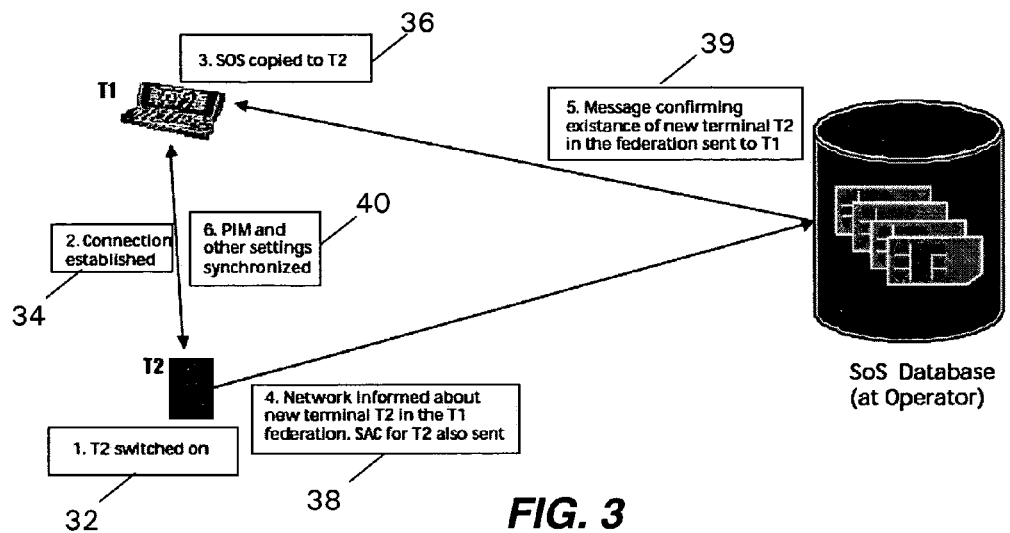
FIG. 3 is a diagram depicting operations involved in a sequence of associating a terminal to a new device federation in accordance with an exemplary embodiment.

FIG. 3 illustrates a SoS working sequence when a new federation is established to illustrate operations in using a SoS when a new terminal joins the federation or association of devices using the SoS. Additional, fewer, or different operations may be performed depending on the embodiment. By way of example, a user buys a new, "SIMless" terminal (T2) and wants to make it part of his SoS group. In an operation 32, the user switches on the new terminal (T2). In an operation 34, T1 establishes a connection with T2. The connection can be established using short range communication techniques like Bluetooth, IRDA, WLAN, cable or cellular communication techniques like GSM, WCDMA, CDMA2000 some other connection technique.

In an operation 36, the user activates the SoS transfer, for example clicking on "Transfer SoS" in the menu of T1. Before the SoS transfer begins, the T1 terminal challenges the user to identify itself as the owner of T1. Once identity of user is verified, the SoS is transferred from T1 to T2.

To ensure that the network is informed about the existence of a new terminal in the user's federation, and understands which of these is active, both T1 and T2 send their respective SACs to the network SoS database. The network knowing T1 is active transfers all calls and messages to T1, in an operation 38. In an operation 39, a message confirming existence of new terminal T2 in the federation is sent to T1.

Once the SoS has been transferred to T2 and a handshake established, T1 asks the user if the PIM and other settings between the two terminals need to be synchronized, in an operation 40. If the user selects "Yes," the PIM database and other terminal settings (e.g. connectivity settings) are synchronized with T2 using the OMA Sync and OMA Device Management framework.

After the synchronization is successful, the T1 asks the user if he would like to continue with T1 as the active terminal. If the user says "YES," T1 behaves as the active terminal. When the user wants to activate T2, he can select "activate" T2 from the T1 menu, which sends the SAC message to T2 asking it to be the active and the same time the network is also informed of the changes in the federation. T2 can also be designated "active" from T2 itself. In case T2 is out of range of bluetooth or IRDA for transferring "active" status, a SAC is sent by a cellular carrier, such as GSM/WCDMA via the network. In case of more than two terminals in a federation, the user can choose which terminals to activate from T1.

Figure 4:
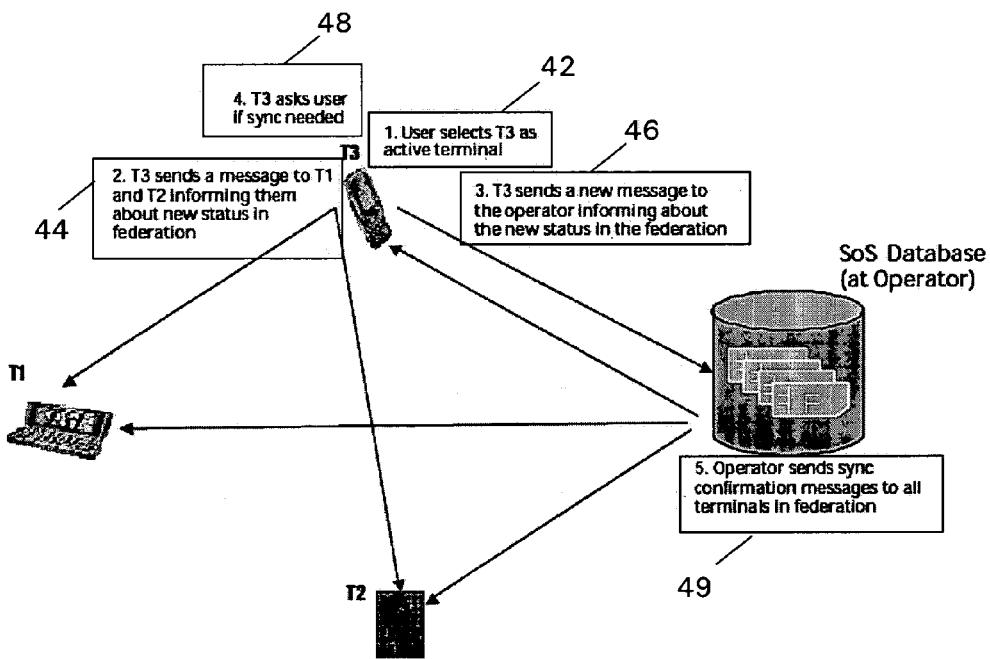
FIG. 4 is a diagram depicting operations involved in a sequence of associating a terminal to an existing federation in accordance with an exemplary embodiment.

FIG. 4 illustrates a SoS working sequence in an existing federation of devices T1, T2 and T3. For example, consider a user who is currently using T1 wants to change his terminal and use T3. In an operation 42, the user picks up T3 and activates it. T3 sends a message to T1 and T2 in an operation 44, informing them about the new status in the federation.

In an operation 46, T3 sends a message to the operator network updating on the new status of the federation. This message contains SACs of each of the terminals so that the operator knows where to route the future messages and calls. In an operation 48, the user is asked if he would like to sync T3 to ensure latest data and settings. If the user clicks "Yes," all data and settings are updated using OMA Sync and Device Management frameworks. At the end of synchronization a confirmation message is sent to all the federated terminals, i.e. T1, T2 and T3, in an operation 49.

The methods and systems described provide advantages to multiple device ownership (MDO) as users find it easy to switch between terminals without loosing their data or settings.

This detailed description outlines exemplary embodiments of a method, and system for transferring subscriber identity information from one terminal to another. In the foregoing description, for purposes of explanation, numerous specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:

1. A method comprising:
   establishing a connection between a first terminal and a second terminal; and
   communicating a software subscriber identity module from the first terminal to the second terminal, wherein communicating the software subscriber identity module includes:
      determining whether to include a standard component in the software subscriber identity module, wherein the standard component includes handshaking information required to make a successful connection with a network;
      including an active component in the software subscriber identity module under all circumstances so that the second terminal can establish an additional connection with the network; and
      transmitting the software subscriber identity module with the active component from the first terminal to the second terminal without including any standard component upon determining to not include a standard component in the software subscriber identity module.

2. The method of claim 1, further comprising synchronizing data in the first terminal with data in the second terminal.

3. The method of claim 1, further comprising verifying user identity at the first terminal before the software subscriber identity module is communicated.

4. The method of claim 1, further comprising communicating an active status message to a software subscriber identity module database.

5. The method of claim 1, wherein the active component is communicated between the first terminal and the second terminal for all communications between the terminals.

6. The method of claim 1, further comprising:
   receiving, at the first terminal, a confirmation message from a software subscriber identity module database confirming that the second terminal has already been made part of a federation with the first terminal.

7. An apparatus comprising:
   a software subscriber identity module including subscriber identity information;
   a database having data associated with the software subscriber identity module; and
   a processor configured to:
      determine whether a standard component is to be communicated to a second terminal as part of the software subscriber identity module, wherein the standard component includes handshaking information required to make a successful connection with a network;
      in response to determining that the standard component is not to be communicated to the second terminal, communicating a portion of the software subscriber identity module including an active component without communicating any standard component to the second terminal; and
      in response to determining that the standard component is to be communicated to the second terminal, communicate the software subscriber identity module including both the standard component and the active component to the second terminal, wherein the first terminal is configured to always communicate the active component to the second terminal so that the second terminal can establish a connection with a network.

8. The apparatus of claim 7, wherein the standard component is communicated if it doesn't exist in the second terminal.

9. The apparatus of claim 7, wherein the standard component is communicated if a standard component information in the second terminal is not supported by the first terminal.

10. The apparatus of claim 7, wherein the database receives status information regarding which terminal is an active terminal.

11. The apparatus of claim 7, wherein the standard component and the active component, when communicated, are communicated from the first terminal to the second terminal using a short range communications technique.

12. The apparatus of claim 7, wherein the standard component and the active component, when communicated, are communicated from the first terminal to the second terminal using cellular communications.

13. The apparatus of claim 7, wherein the database is located within the network.

14. An apparatus comprising:
    a processor configured to execute programmed instructions; and
    a store that maintains programmed instructions and a software subscriber identity module including subscriber information for associating the apparatus with a subscriber service, wherein the apparatus is configured to:
       determine whether a standard component is to be communicated to another apparatus as part of the software subscriber identity module, wherein the standard component includes handshaking information required to make a successful connection with a network;
       in response to determining that the standard component is not to be communicated to the other apparatus, communicate a portion of the software subscriber identity module including an active component without communicating any standard component to the other apparatus; and
       in response to determining that the standard component is to be communicated to the other apparatus, communicate the software subscriber identity module including both the standard component and the active component to the other apparatus, wherein the apparatus is configured to always communicate the active component to the other apparatus so that the other apparatus can establish a connection with a network.

15. The apparatus of claim 14, wherein the standard component is communicated to the other apparatus only when needed and the active component is communicated to the other apparatus each time the user sets the other apparatus as an active terminal.

16. The apparatus of claim 14, wherein the standard component is communicated if it doesn't exist in the other apparatus.

17. The apparatus of claim 14, wherein the standard component is communicated if the standard component information in the other apparatus is not supported by the apparatus.

18. The apparatus of claim 14, wherein the programmed instructions comprise directions for communicating the software subscriber identity module to the other apparatus.

19. An apparatus comprising:
    means for establishing a connection between a first terminal and a second terminal;

means for determining whether a standard component is to be communicated to the second terminal as part of a software subscriber identity module, wherein the standard component includes handshaking information required to make a successful connection with a network;

means for, in response to determining that the standard component is not to be communicated to the second terminal, communicating a portion of the software subscriber identity module including an active component without communicating any standard component to the second terminal; and means for, in response to determining that the standard component is to be communicated to the second terminal, communicating the software subscriber identity module including both the standard component and the active component to the other apparatus, wherein the first terminal is configured to always communicate the active component to the second terminal so that the second terminal can establish a connection with a network.

20. The apparatus of claim 19, further comprising means for synchronizing data in the first terminal with data in the second terminal.

21. The apparatus of claim 19, further comprising means for verifying user identity at the first terminal before the software subscriber identity module is communicated.

22. The method of claim 1, wherein the standard component is common to all terminals in a federation and wherein the active component is unique to the first terminal, wherein the federation is different from the network.

23. The method of claim 22, wherein communicating a software subscriber identity module from the first terminal to the second terminal includes transmitting, from the first terminal, the active component to a network software subscriber identity module database.

24. One or more non-transitory computer readable media storing computer readable instructions that, when executed, cause an apparatus to perform a method comprising:

establishing a connection between a first terminal and a second terminal;

determining whether a standard component is to be communicated to the second terminal as part of a software subscriber identity module, wherein the standard component includes handshaking information required to make a successful connection with a network;

in response to determining that the standard component is not to be communicated to the second terminal, communicating a portion of the software subscriber identity module including an active component without communicating any standard component to the second terminal; and in response to determining that the standard component is to be communicated to the second terminal, communicating the software subscriber identity module including both the standard component and the active component to the other apparatus, wherein the first terminal is configured to always communicate the active component to the second terminal so that the second terminal can establish a connection with a network.

25. The one or more computer readable media of claim 24, wherein the standard component is common to all terminals in a federation and wherein the active component is unique to the first terminal, wherein the federation is different from the network.

26. The one or more computer readable media of claim 24, wherein the subscriber information included in the standard component and the active component is encrypted.

\* \* \* \* \*